United States Patent
Smith

(10) Patent No.: US 11,425,776 B1
(45) Date of Patent: Aug. 23, 2022

(54) ELECTRONIC DEVICE WIRELESS NETWORK CONNECTION USING NETWORK CREDENTIALS RECEIVED OVER WIRELESS SIDEBAND COMMUNICATION CHANNEL

(71) Applicant: Hewlett-Packard Development Company, L.P., Spring, TX (US)

(72) Inventor: Kenneth K. Smith, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/208,135

(22) Filed: Mar. 22, 2021

(51) Int. Cl.
 *H04W 76/19* (2018.01)
 *H04W 12/08* (2021.01)
 *G06F 3/12* (2006.01)

(52) U.S. Cl.
 CPC ............ *H04W 76/19* (2018.02); *G06F 3/121* (2013.01); *G06F 3/1236* (2013.01); *H04W 12/08* (2013.01)

(58) Field of Classification Search
 CPC ....... H04W 76/19; H04W 12/08; G06F 3/121; G06F 3/1236
 See application file for complete search history.

(56) References Cited

U.S. PATENT DOCUMENTS

| | | | | |
|---|---|---|---|---|
| 9,420,496 | B1 * | 8/2016 | Indurkar | H04W 76/19 |
| 10,593,174 | B1 * | 3/2020 | Yoon | H04W 76/19 |
| 11,140,738 | B1 * | 10/2021 | Rane | H04W 76/19 |
| 2010/0246554 | A1 * | 9/2010 | Alapuranen | H04W 40/22 |
| | | | | 370/343 |
| 2016/0366571 | A1 * | 12/2016 | Payne | H04W 76/19 |
| 2017/0279664 | A1 * | 9/2017 | Zhang | H04L 12/28 |

* cited by examiner

*Primary Examiner* — Juan M Guillermety
(74) *Attorney, Agent, or Firm* — Michael Dryja

(57) ABSTRACT

An electronic device is detected as no longer being connected to a first wireless network via which the electronic device had network connectivity. Over a wireless sideband communication channel, a host computing device subsequently communicates to the electronic device network credentials for a second wireless network that is accessible by the electronic device and for which the host computing device has the network credentials. The electronic device responsively connects to the second wireless network using the network credentials communicated from the host computing device. The electronic device then has the network connectivity via the second wireless network.

15 Claims, 8 Drawing Sheets

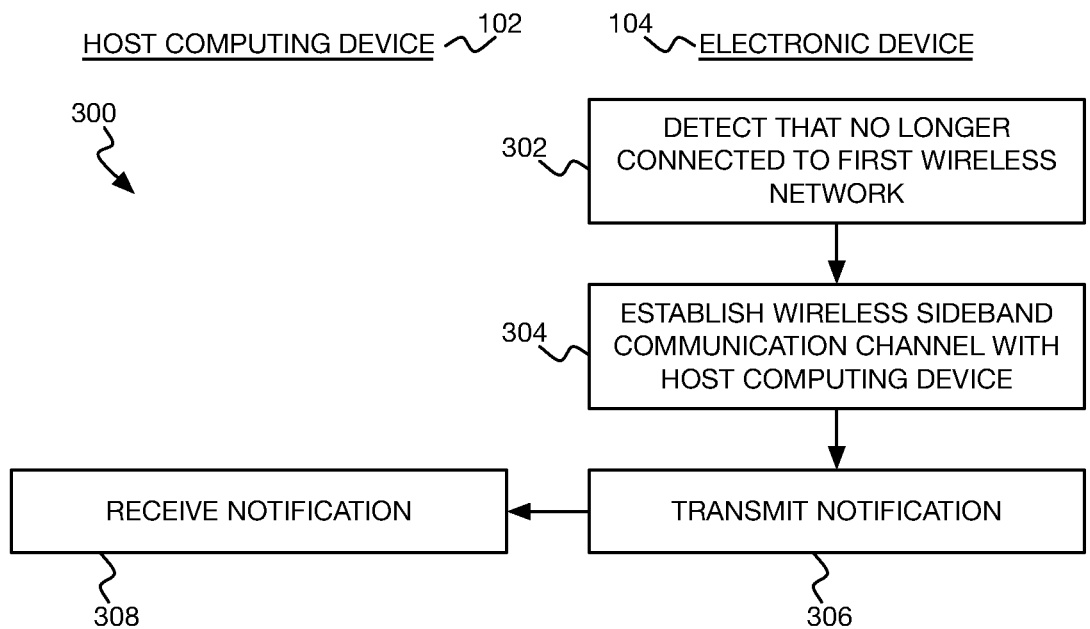
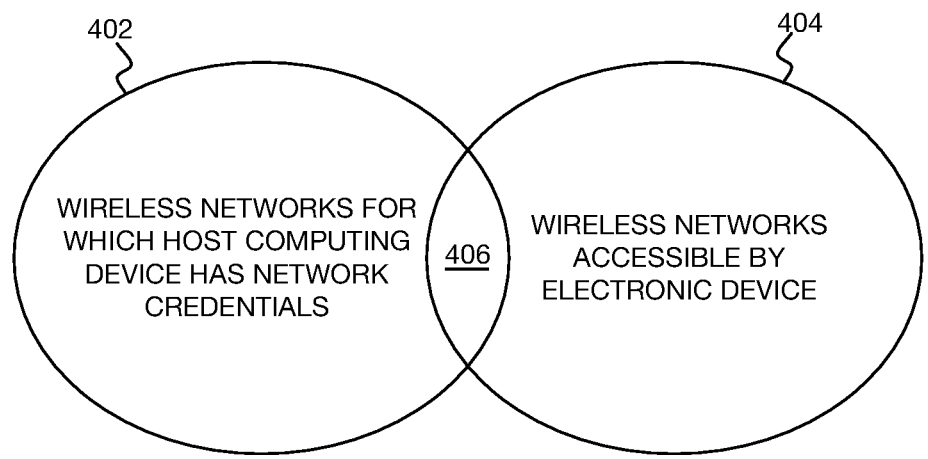

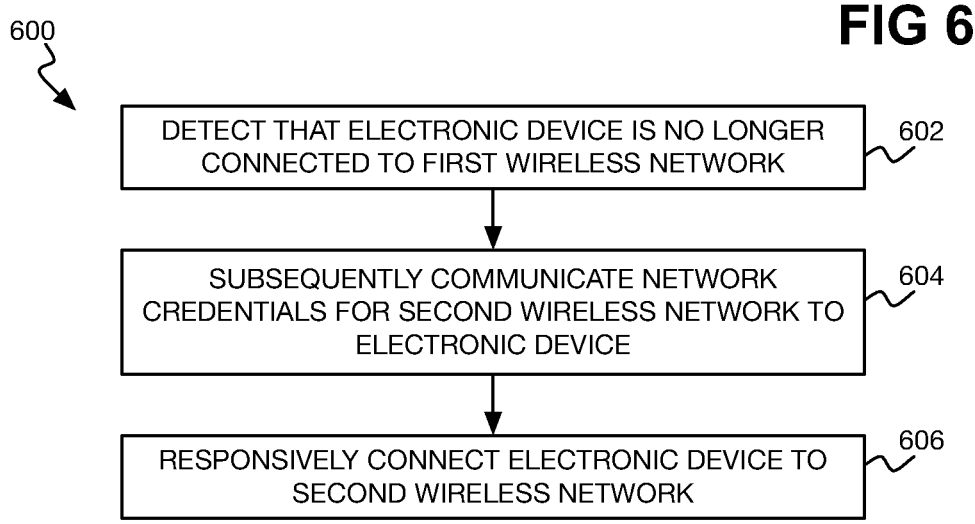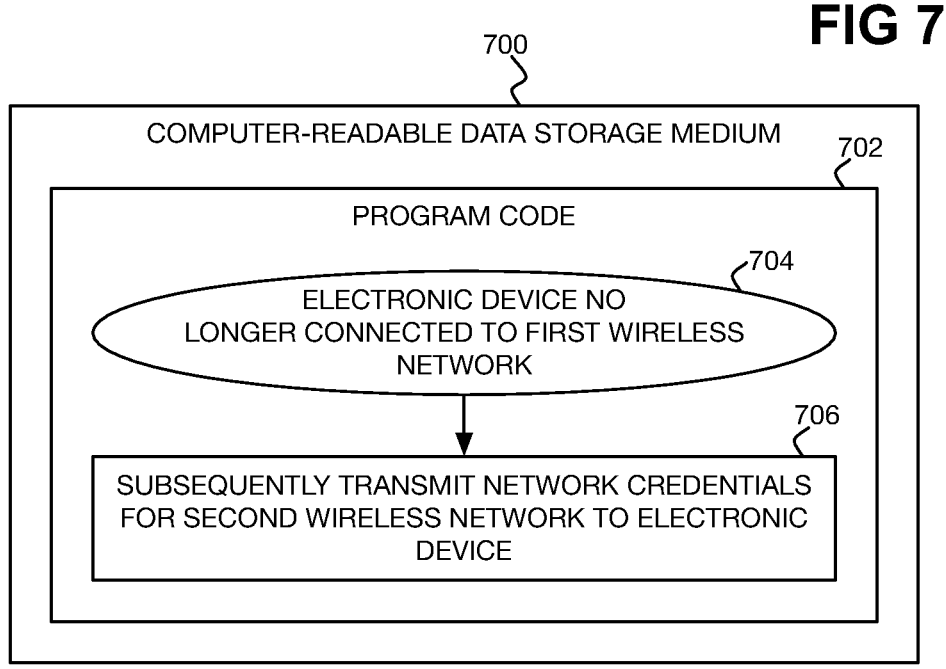

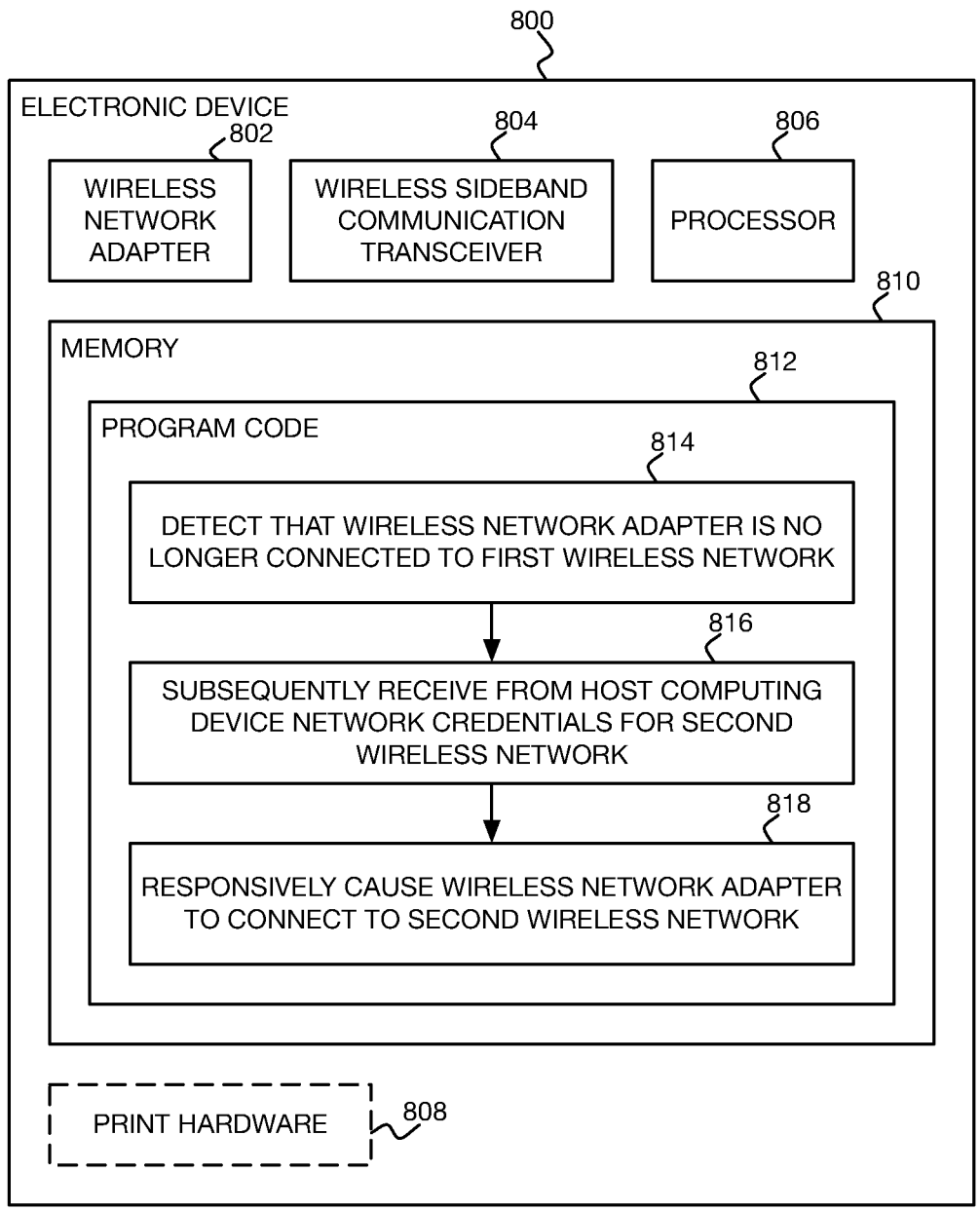

ELECTRONIC DEVICE WIRELESS NETWORK CONNECTION USING NETWORK CREDENTIALS RECEIVED OVER WIRELESS SIDEBAND COMMUNICATION CHANNEL

BACKGROUND

Users of computing devices like desktop, laptop, and notebook computers, as well as smartphones, tablet computing devices, and other types of computing devices, often employ peripheral devices with their computing devices. Examples of peripheral devices include printing devices, such as standalone printers and multifunction devices (MFD) that in addition to printing functionality have other functionality, including scanning, copying, and/or faxing functionality. Traditionally, computing devices communicated with peripheral devices over wired connections using cables. More recently, wireless communication between computing devices and peripheral devices has become more popular.

BRIEF DESCRIPTION OF THE DRAWINGS

FIG. 3 is a flowchart of an example method that is performed when an electronic device becomes disconnected from a first wireless network.

FIG. 4 is a Venn diagram depicting example overlap between wireless networks for which a host computing device has network credentials and wireless networks that are accessible by an electronic device.

FIG. 6 is a flowchart of an example method.

FIG. 7 is a diagram of an example non-transitory computer-readable data storage medium.

FIG. 8 is a diagram of an example electronic device, such as a peripheral device like a printing device.

DETAILED DESCRIPTION

Figure 1A:
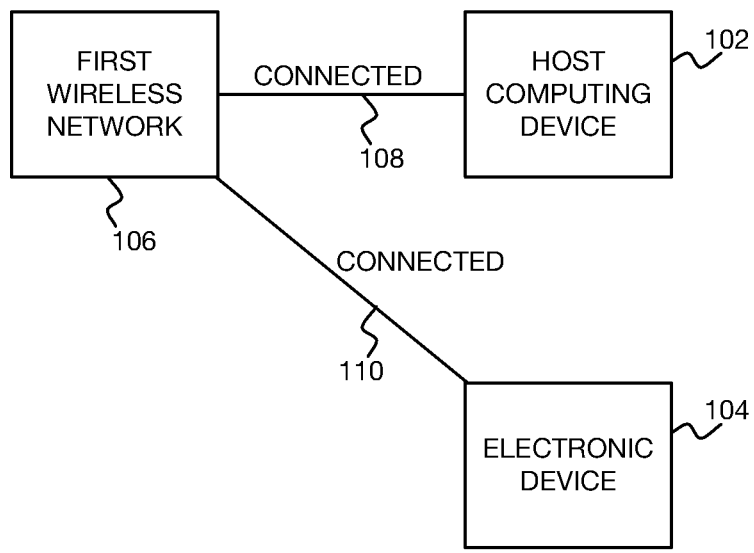
FIGS. 1A, 1B, and 1C are diagrams illustratively depicting example connection of an electronic device to a second wireless network using network credentials received over a wireless sideband communication channel, after the electronic device has become disconnected from a first wireless network.

As noted in the background section, some peripheral devices can wirelessly communicate with computing devices. For example, a peripheral device may connect to a wireless network, such as a wireless local area network (WLAN), using various IEEE 802.11 network protocols as governed by the Wi-Fi Alliance under the Wi-Fi® trademark. Once connected to a wireless network, the peripheral device has network connectivity, and therefore can communicate with other devices, such as computing devices, on the same network, which may be exclusively wireless, or may be a hybrid wireless-wired network. Via such network connectivity, the peripheral device may further be able to communicate over other networks, such as the Internet, if the wireless network is connected to such networks.

The peripheral device may become disconnected from the wireless network, thereby losing network connectivity and the ability to communicate with other devices. For example, the wireless network may be established by a wireless router or access point. To limit access to the wireless network and for overall network security, the wireless network may be secured by network credentials, including a network name, such as a service set identifier ("SSID") in the case of a WLAN, and a passphrase. If the network name or passphrase changes or the security protocol by which secure wireless communication is afforded changes, the peripheral device will become disconnected from the wireless network. For example, the wireless router or access point may be reconfigured with a different network name, passphrase, and/or security protocol, or may be replaced with a different router or access point having a different network name and/or passphrase and/or using a different security protocol.

When a peripheral device loses network connectivity via no longer being connected to a wireless network, the device may provide a notification on a control panel of the peripheral device. For example, a light-emitting diode (LED) or other indicator may flash or change color. As another example, the peripheral device may display a message indicating that the device is no longer connected to a wireless network. In the former case, a user may not know what the flashing indicator means, and in both cases, it can be difficult for the user to reconnect the peripheral device to a wireless network.

For instance, unlike computing devices like desktop, laptop, and notebook computers, smartphones, and tablet computing devices that have physical or virtual keyboards, many types of peripheral devices, such as printing devices, often lack such keyboards. The devices may not be as actively attended to as computing devices. Therefore, a user may be unable to select a new wireless network by network name, and/or may be unable to enter the passphrase for the wireless network, and/or even correctly recognize that the peripheral device has lost connection with the wireless network. In such cases, the user may be requested to reperform setup of the peripheral device no differently than when the user first installed the device. Such initial setup can be unwieldy and time-consuming, however, and can require certain actions to be performed that are unnecessary in the context of reestablishing wireless network connectivity after existing such connectivity has been lost.

Techniques described herein ameliorate these and other shortcomings. Subsequent to detection that an electronic device, such as a peripheral device, is no longer connected to a first wireless network via which the electronic previously had network connectivity, network credentials for a second wireless network are communicated from a host computing device to the electronic device over a wireless sideband communication channel. The second wireless network is one that is accessible by the electronic device and for which the host computing device has network credentials. The electronic device can thus responsively connect to the second wireless network using the network credentials communicated from the host computing device to regain network connectivity.

The communication of the network credentials for the second wireless network from the host computing device to the electronic device may be automatic, ensuring seamless network connectivity at the electronic device when the device is no longer connected to a wireless network. Even if such communication is not automatic, however, providing network credentials over a wireless sideband communication channel permits the electronic device to regain network connectivity easily, with minimal user inconvenience. For example, a user does not have to reperform setup of the electronic device as if the device were being installed for the first time.

Figure 1B:
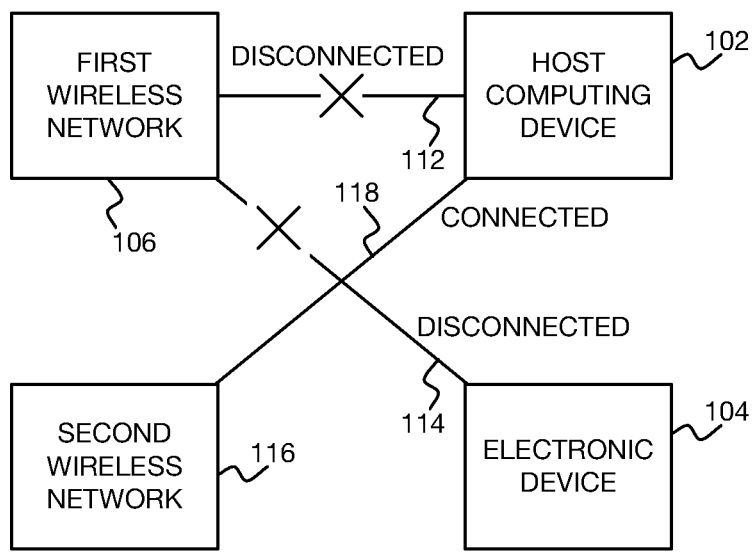
Figure 1C:
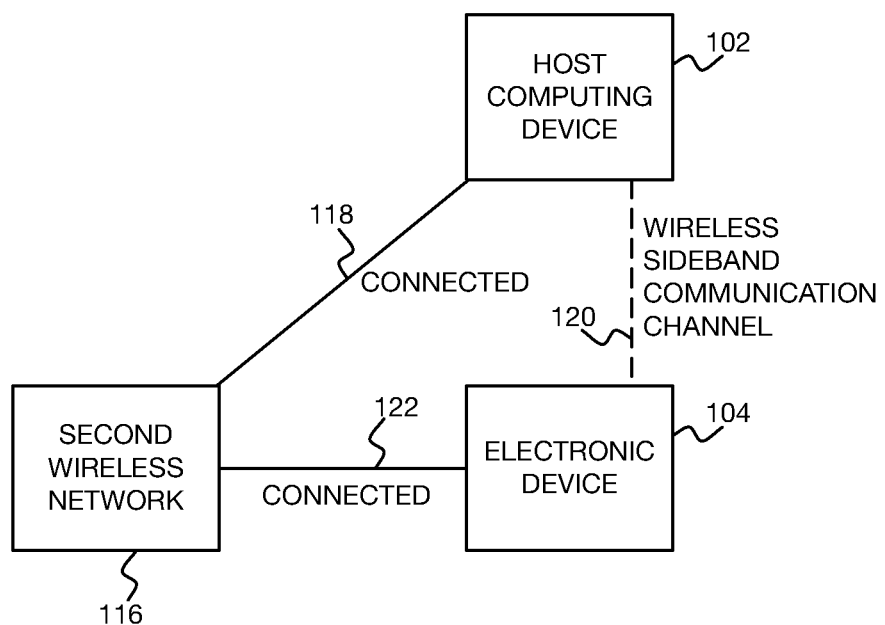

FIGS. 1A, 1B, and 1C illustratively depict example connection of an electronic device to a second wireless network using network credentials received over a wireless sideband communication from a host computing device, after the electronic device has lost an existing connection to a first wireless network. In FIG. 1A, both a host computing device 102 and an electronic device 104 are initially connected to a first wireless network 106, per solid lines 108 and 110, respectively. The host computing device 102 may be a desktop, laptop, or notebook computer, or another type of computing device, such as a smartphone or tablet computing device. The electronic device 104 may be a peripheral device, such as printing device, like a standalone printer or a multifunction device (MFD) including printing functionality, or another type of peripheral device. The electronic device 104 may more generally be any type of electronic device that is to wirelessly communicate with the host computing device, including Internet of Things (IoT) devices such as sensors, and so on.

The first wireless network 106 may be a Wi-Fi® network established by a wireless router or access point, or another type of WLAN or another type of wireless network. The first wireless network 106 may be secured by network credentials, including a network name, such as an SSID, a passphrase, and a security protocol. Therefore, both the host computing device 102 and the electronic device 104 have such network credentials, providing them with network connectivity via their wireless connections to the first wireless network 106. For example, the host computing device 102 may be able to transmit print jobs to the electronic device 104 for printing in the case in which the device 104 is a printing device, and the electronic device 104 may be able to provide status information back to the computing device 102, over the wireless network 106. As another example, the devices 102 and 104 may be able to communicate over other networks communicatively connected to the wireless network 106, such as the Internet.

In FIG. 1B, the host computing device 102 and the electronic device 104 have become disconnected from the first wireless network 106, per x-ed out lines 112 and 114, respectively. However, the host computing device 102, but not the electronic device 104, may have connected to a second wireless network 116, per solid line 118. The second wireless network 116 can be the same type of network as the first wireless network 106, in that both wireless networks 106 and 116 use the same underlying networking technology, such as Wi-Fi®, although potentially at different frequencies. The second wireless network 116 may also be secured by network credentials, including a network name, such as an SSID, a passphrase, and a security protocol. The host computing device 102 may have been previously configured with the network credentials of the second wireless network 116, or a user may have entered or otherwise selected the network name of the wireless network 116 and then have entered its passphrase.

The second wireless network 116 can be a different wireless network than the first wireless network 106 in one of a number of different ways. The second wireless network 116 may be established by a different wireless router or access point than the first wireless network 106, with a different network name, passphrase, and/or security protocol. In such instance, the wireless router or access point that had established the first wireless network 106 may have been turned off or otherwise removed from service. As another example, the second wireless network 116 may be established by the same wireless router or access point as the first wireless network 106, but with a different network name and/or passphrase. That is, changing the network name and/or passphrase of the first wireless network 106 in effect results in creation of the second wireless network 116 as a new, different wireless network. As a third example, the second wireless network 116 may be established by the same or different wireless router or access point as the first wireless network 106, and even with the same network name and/or passphrase, but with a different security protocol. That is, changing the security protocol, regardless of whether the network name and/or passphrase also changes, in effect results in creation of the second wireless network 116 as a new, different wireless network.

The second wireless network 116 is accessible by the electronic device 104, even though the electronic device 104 is not connected to the wireless network 116. That the second wireless network 116 is accessible by the electronic device 104 means that the wireless network 116 is within wireless range of the device 104. As one example, the wireless router or access point that established the second wireless network 116 may periodically broadcast the network name of the wireless network 116, which the electronic device 104 can receive. That is, the electronic device 104 can be said to have access to the second wireless network 116 in that if the device 104 had (even though it may not have) the network credentials for the wireless network 116, the electronic device 104 would be able to connect to the network 116 and thus regain network connectivity.

In FIG. 1C, a wireless sideband communication channel has been established between the host computing device 102 and the electronic device 104, per dashed line 120. The host computing device 102, which may be or remain connected to the second wireless network 116 per solid line 118, provides the network credentials for the second wireless network 116 to the electronic device 104 over the wireless sideband communication channel. The electronic device 104 can then connect to the second wireless network 116, per solid line 122, and therefore regain network connectivity that the device 104 previously had via the first wireless network 106.

The wireless sideband communication channel can use a different wireless networking technology, such as a different wireless protocol, than that by which the electronic device 104 connects to the wireless networks 106 and 116. For example, the electronic device 104 may connect to the wireless networks 106 and 116 using Wi-Fi® or another IEEE 802.11 network protocol. By comparison, the wireless sideband communication channel may be established between the devices 102 and 104 using Bluetooth® wireless technology, or another wireless technology that may provide for point-to-point wireless communication instead of wireless networking. Another example of such wireless technology by which a wireless sideband communication channel can be established is long range wireless technology, such as LoRa®.

Figure 2A:
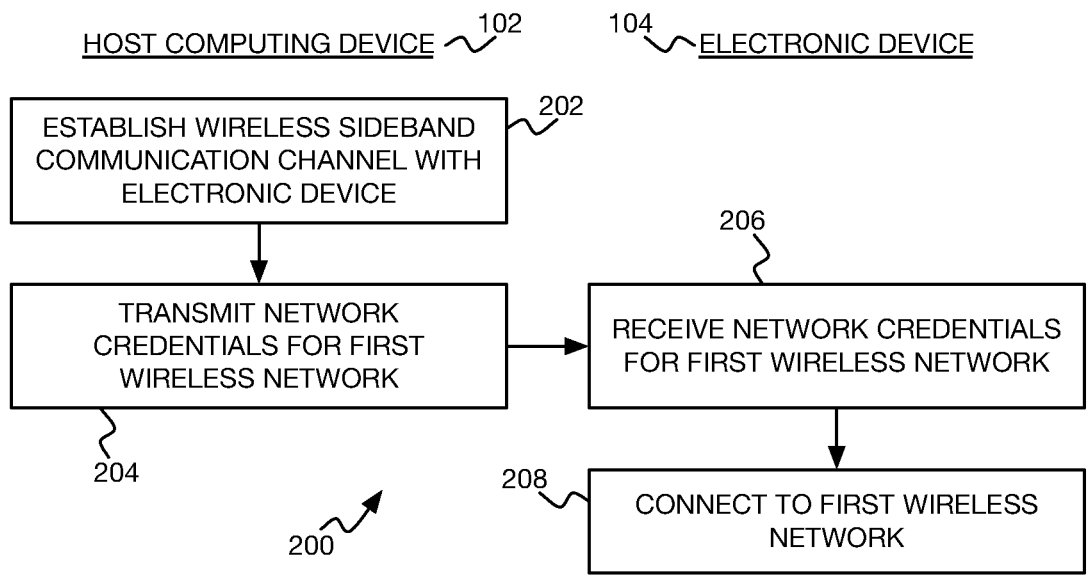
FIGS. 2A and 2B are flowcharts of example methods for initial connection of an electronic device to a first wireless network using network credentials provided by a host computing device.
Figure 2B:
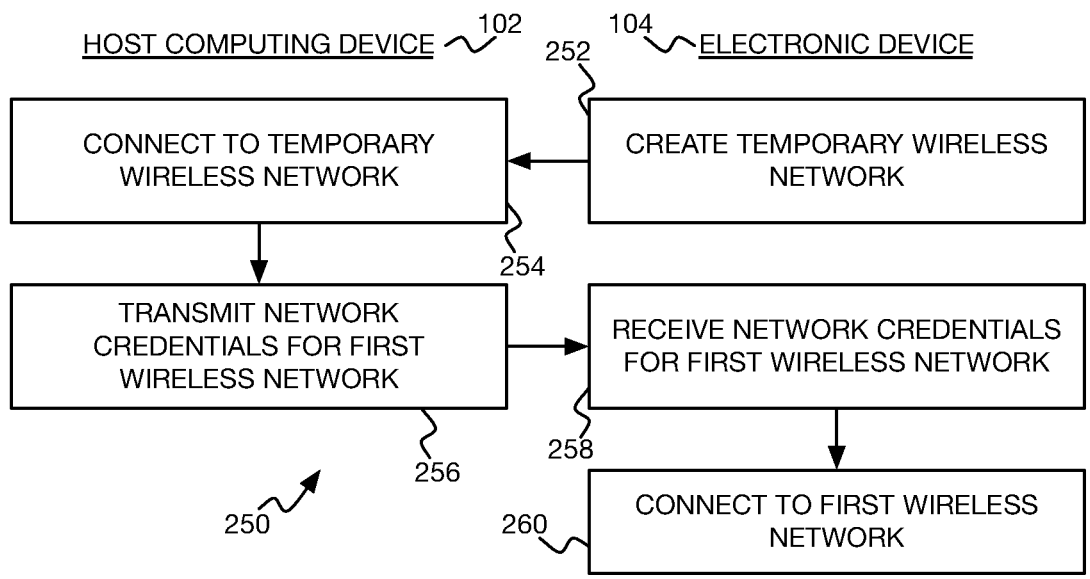

FIGS. 2A and 2B show different methods 200 and 250, respectively, by which the electronic device 104 can initially connect to the first wireless network 106. The left parts of the methods 200 and 250 are performed by the host computing device 102, and the right parts are performed by the electronic device 104. The left and right parts of the methods 200 and 250 may each be implemented as program code stored on a non-transitory computer-readable data storage medium and executed by the devices 102 and 104, respectively. Furthermore, the electronic device 104 may initially connect to the first wireless network 106 to achieve network connectivity in a different way, other than via the method 200 or 250.

In the method 200 of FIG. 2A, the host computing device 102 establishes a wireless sideband communication channel with the electronic device 104 (202), and transmits network credentials for the first wireless network 106 to the electronic device 104 over the wireless sideband communication channel (204). The first wireless network 106 is selected as a wireless network that is accessible by the electronic device 104 in this respect. The electronic device 104 receives the network credentials for the first wireless network 106 using the provided network credentials (206), and responsively connects to the wireless network 106 (208), thereby gaining network connectivity.

In the method 250 of FIG. 2B, the electronic device 104 creates a temporary wireless network (252), as if the device 104 were a wireless router or access point, for instance. The temporary wireless network may be an ad hoc network, and may further be unsecured, such that the network credentials for the wireless network may include a network name but not a passphrase or security protocol. The host computing device 102 then connects to the temporary wireless network (254), and transmits network credentials for the first wireless network 106 via the network connectivity afforded by the temporary wireless network (i.e., over this network) (256). The electronic device 104 receives the network credential credentials (258), and responsively connects to the first wireless network 106 using the provided network credentials (260) to gain network connectivity. Connection of the electronic device 104 to the first wireless 106 may thus result in termination of the temporary wireless network.

One difference between the methods 200 and 250 is therefore how the electronic device 104 receives the network credentials for the first wireless network 106 from the host computing device 102. In the method 200, the network credentials are received over a wireless sideband communication channel that may use a different wireless networking technology than the first wireless network 106 (and the second wireless network 116). By comparison, in the method 250, the network credentials are received over a temporary wireless network that may use the same wireless networking technology, such as Wi-Fi®, as the first wireless network 106 (and the second wireless network 116).

FIG. 3 shows an example method 300 that is performed when the electronic device 104 is no longer connected to the first wireless network 106 and thus loses network connectivity via the first wireless network 106. The method 300 may therefore be performed after the method 200 or 250 has been performed. The left part of the method 300 is performed by the host computing device 102, whereas the right part is performed by the electronic device 104. As with the methods 200 and 250, the left and right parts of the method 300 may each be implemented as program code stored on a non-transitory computer-readable data storage medium and executed by the devices 102 and 104, respectively.

The electronic device 104 detects that it is no longer connected to the first wireless network 106 (302). For example, the Wi-Fi® wireless network protocol, as well as other IEEE 802.11 wireless network protocol and other WLAN protocols, can provide for regular periodic communication between the electronic device 104 and the wireless router or access point that established the wireless network 106. When the electronic device 104 is no longer able to send or receive such periodic communication, then the device 104 can accordingly detect that it is no longer connected to the first wireless network 106.

The electronic device 104 can responsively establish a wireless sideband communication channel with the host computing device 104 (304), if such a channel is not already established (or was established and then was subsequently terminated). The electronic device 104 can then transmit a notification to the host computing device 102 over this channel that the device 104 is no longer connected to the first wireless network 106 (306). The host computing device 102 accordingly receives this notification (308).

Receipt of notification at the host computing device 102 that the electronic device 104 is no longer connected to the first wireless network 106 can occur in other ways as well. For example, the electronic device 104 may have a cellular network connection, such as a 4G or 5G connection, to a mobile telephony network, by which the device 104 can send a text notification to a smartphone or an email to a user of the host computing device 102. Once the user has received the text or email, the host computing device 102— which may be a different device than the smartphone or device at which the text or email is received—is considered to have received the notification when the user causes the device 102 to send network credentials for the second wireless network 116 to the electronic device 104.

FIG. 4 shows a Venn diagram of wireless networks 402 for which the host computing device 102 has network credentials and wireless network 404 that are accessible by the electronic device 104. The second wireless network 116 for which the computing device 102 sends network credentials to the electronic device 104, which the device 104 then uses to connect to the network 116, is selected as one of the overlapping wireless networks 406 that are both networks 402 and networks 404. That is, the second wireless network 116 is selected as one of the wireless networks 402 for which the computing device 102 has network credentials and that is also one of the wireless networks 404 accessible by the electronic device 106. Either the wireless networks 402 can be determined by the computing device 102 and then sent to the electronic device 104 to determine which are also networks 404, or the wireless networks 404 can be determined by the device 104 and sent to the device 102 to determine which are also networks 402.

Figure 5A:
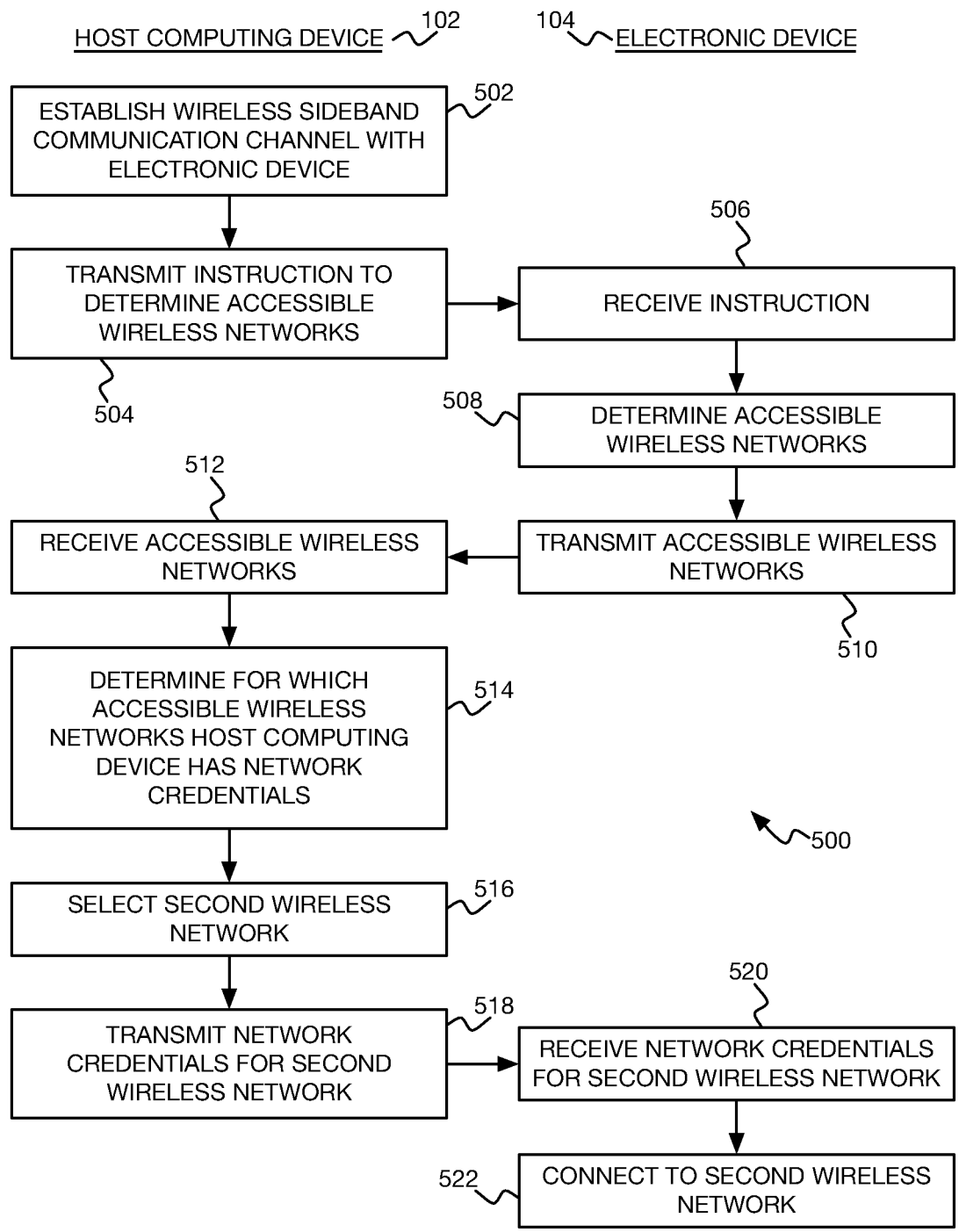
FIGS. 5A and 5B are flowcharts of example methods for connection of an electronic device to a second wireless network using network credentials received over a wireless sideband communication channel from a host computing device, after the electronic device has been disconnected from a first wireless network.
Figure 5B:
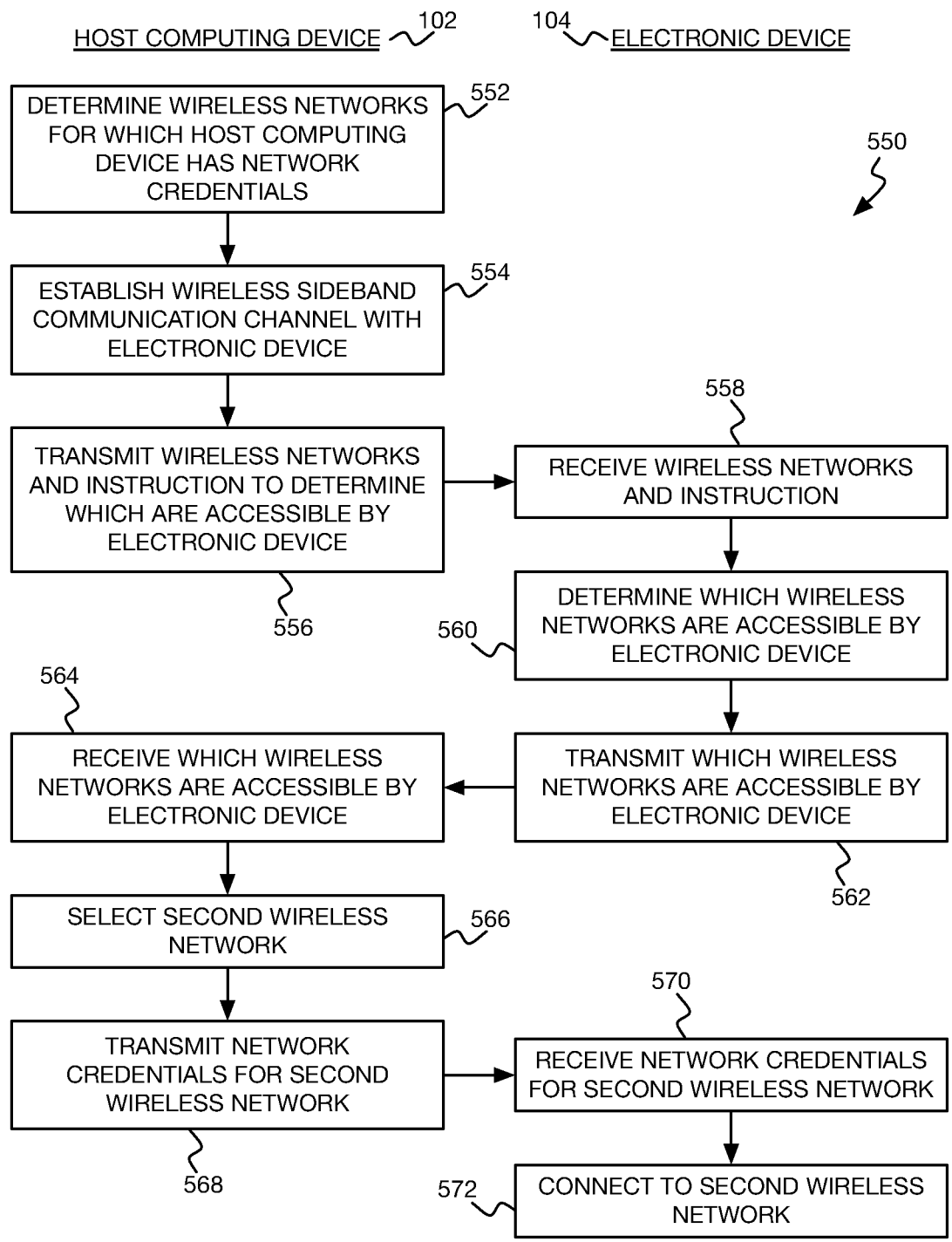

FIGS. 5A and 5B accordingly show different methods 500 and 500, respectively, for connecting the electronic device 104 to the second wireless network 116. The left parts of the methods 500 and 550 are performed by the host computing device 102, and the right parts are performed by the electronic device 104. As with the previously described methods, the left and right parts of the methods 500 and 550 may each be implemented as program code stored on a non-transitory computer-readable data storage medium and executed by the devices 102 and 104, respectively.

The method 500 or 550 is performed once the electronic device 104 is no longer connected to the first wireless network 106. Therefore, the method 500 or 550 may be performed after the method 300 has been performed. The method 500 or 550 may be automatically performed after the host computing device 102 receives notification that the electronic device 104 is no longer connected to the first wireless network 106, or manually at the initiation of a user.

In the method 500 of FIG. 5A, the host computing device 102 establishes a wireless sideband communication with the electronic device 104 (502), if such a channel is not already established (or was established and then was subsequently terminated). The host computing device 102 transmits an instruction to the electronic device 104 over the wireless sideband communication channel for the device 104 to determine the wireless networks 404 accessible by the electronic device 104 (504). The electronic device 104 accordingly receives this instruction (506).

In response, the electronic device 104 determines the wireless networks 404 accessible by the device 104 (508). For example, in the case of Wi-Fi® networks, the electronic device 104 may scan the available frequencies to assemble a list of wireless networks 404 that are within wireless range of the device 104 and that are broadcasting their network names (508). The electronic device 104 then sends the network names of these determined wireless networks 404 over the wireless sideband communication channel to the host computing device 102 (510), which receives this list (512).

The host computing device 102 determines for which of the received wireless networks 404 the device 102 has network credentials (514). For instance, the computing device 102 can retrieve a previously stored list of the wireless networks 402 for which the device 102 has network credentials, and determine which of these wireless networks 402 are each also one of the wireless networks 404. That is, the computing device 102 determines the wireless networks 406 that are both accessible by the electronic device 104 and for which the device 102 has network credentials. In one implementation, a user of the computing device 102 may view the list of wireless networks 404 accessible by the electronic device 104, and enter the network credentials for any such wireless network 404 as known by the user, if the device 102 does not already have stored network credentials for the network 404 in question.

The host computing device 102 then selects the second wireless network 116 as one of the wireless networks 406 that are both accessible by the electronic device 104 and for which the device 102 has network credentials (516). The host computing device 102 may automatically select the second wireless network 116 without user intervention. For example, the electronic device 104 may provide to the computing device 102 the signal strength at which each wireless network 404 is accessible by the device 104, and the computing device 102 may select the wireless network 404 having the highest signal strength and that is also a wireless network 402. In another implementation, a user of the host computing device 102 may manually select the second wireless network 116 from a displayed list of the networks 406.

The host computing device 102 transmits the network credentials for the selected second wireless network 116 to the electronic device 104 over the wireless sideband communication channel (518). The electronic device 104 accordingly receives these network credentials (520), and in response connects to the second wireless network 116 using the provided network credentials (522). The electronic device 104 therefore again has network connectivity via the second wireless network 116, whereas previously it had (and lost) network connectivity via the first wireless network 106.

In the method 550 of FIG. 5B, the host computing device 102 determines the wireless networks 402 for which the device 102 has network credentials (552). The computing device 102 establishes a wireless sideband communication channel with the electronic device 104 (554), if such a channel is not already established (or was established and then was subsequently terminated). The computing device 102 transmits the network names of the wireless networks 402 to the electronic device 104 over the wireless sideband communication channel, along with an instruction for the device 104 to determine which of these networks 402 are accessible by the electronic device 104 (556). The computing device 102 may not transmit the passphrase or otherwise transmit the complete network credentials for any of the wireless networks 402 to the electronic device 104 at this time, however.

The electronic device 104 accordingly receives the list of wireless networks 402 and the instruction (558), and in response determines which of the wireless networks 402 are accessible by the device 104 (560). For example, in the case of a Wi-Fi® network, the electronic device 104 may scan the available frequencies to assemble a list of wireless networks 404 that are within range of the device 104 and that are broadcasting their network names. The electronic device 104 may then determine which of these wireless networks 404 are each also of the wireless networks 402. That is, the electronic device 104 determines the wireless networks 406 that are both accessible by the device 104 and for which the computing device 102 has network credentials.

The electronic device 104 sends the network names of the determined wireless networks 406 over the wireless sideband communication channel to the host computing device 102 (562), which receives this list (564). The electronic device 104 in response selects the second wireless network 116 as one of the wireless networks 406 that are both accessible by the electronic device 104 and for which the device 102 has network credentials (566), either automatically without user intervention or manually via user selection. The computing device 102 transmits the network credentials for the selected second wireless network 116 over the wireless sideband communication channel to the electronic device 104 (568), which accordingly receives these credentials (570). The electronic device 104 in response connects to the second wireless network 116 using the provided network credentials (572).

One difference between the methods 500 and 550 is whether the wireless networks 404 accessible by the electronic device 104 are sent by the device 104 to the computing device 102, as in the method 500, or whether the wireless networks 402 for which host computing device 102 has network credentials are sent by the device 102 to the electronic device 104, as in the method 550. In the method 500, the computing device 102 determines the wireless networks 406 from which the second wireless network 116 is selected, such as by comparing the wireless networks 404 received from the electronic device 104 against the wireless networks 402 for which the device 102 has network credentials. By comparison, in the method 550, the electronic device 104 determines the wireless networks 406, such as by comparing the wireless networks 402 received from the computing device 102 against the wireless networks 404 accessible by the device 104.

FIG. 6 shows an example method 600. The method 600 includes detecting that an electronic device is no longer connected to a first wireless network via which the electronic device had network connectivity (602). The method 600 includes subsequently communicating over a wireless sideband communication channel, from a host computing device to the electronic device, network credentials for a second wireless network that is accessible by the electronic device and for which the host computing device has the network credentials (604). The method 600 includes responsively connecting the electronic device to the second wireless network using the network credentials communicated from the host computing device (606), such that the electronic device then has network connectivity via the second wireless network.

FIG. 7 shows an example non-transitory computer-readable data storage medium 700 storing program code 702 executable by a host computing device to perform processing. The processing includes, subsequent to an electronic device no longer being connected to a first wireless network via which the electronic device had network connectivity (704), transmitting to the electronic device over a wireless sideband communication channel network credentials for a second wireless network for which the host computing device has the network credentials and that is accessible by the electronic device (706). The electronic device can then responsively connect to the second wireless network using the network credentials transmitted by the host computing device, such that the electronic device therefore has network connectivity via the second wireless network.

FIG. 8 shows an example electronic device 800. The electronic device 800 can include a wireless network adapter 802 to connect to a first wireless network and a second wireless network, and a wireless sideband communication channel transceiver 804 to communicate with a host computing device over a wireless sideband communication channel. The parts of the methods that have been described pertaining to communication or functionality associated with the first and second wireless networks, including determining which networks are accessible by the electronic device, may be performed using the wireless network adapter 802. By comparison, the parts of the described methods pertaining to communication or functionality associated with the wireless sideband communication channel may be performed using the transceiver 804.

The electronic device 800 may include print hardware 808, such as laser-printing hardware, inkjet-printing hardware, and so on, by which the device 800 can print, in which case the electronic device 800 is a printing device like a standalone printer or an MFD having printing functionality. The electronic device 800 also includes a processor 806 and a memory 810 storing program code 812 executable by the processor 806.

The program code 812 is executable by the processor 806 to detect that the wireless network adapter 802 is no longer connected to a first wireless network via which the electronic device had network connectivity (814). The program code 812 is executable by the processor 806 to subsequently receive from a host computing device over the wireless sideband communication channel network credentials for a second wireless network for which the host computing device has the network credentials and that is accessible by the electronic device (816). The program code 812 is executable by the processor 806 to responsively cause the wireless network adapter 802 to connect to the second wireless network using the network credentials received from the host computing device, such that the electronic device 800 then has network connectivity via the second wireless network (818).

Techniques have been described for connecting an electronic device to a second wireless network to regain network connectivity upon the electronic device losing such connectivity via disconnection from a first wireless network. The techniques provide a way by which a host computing device can supply network credentials for the second wireless network to the electronic device over a wireless sideband communication channel. A user therefore does not have to reperform setup of the electronic device as was initially performed during installation of the electronic device, and further the network credentials for the second wireless network can be automatically provided to the electronic device to ensure seamless network connectivity at the electronic device.

We claim:

1. A method comprising:
   detecting that an electronic device is no longer connected to a first wireless network via which the electronic device had network connectivity;
   subsequently communicating over a wireless sideband communication channel, to the electronic device from a host computing device that also is no longer connected to the first wireless network via which the host computing device also had the network connectivity, network credentials for a second wireless network different than the first wireless network and the wireless sideband communication channel, that is accessible by the electronic device, for which the host computing device has the network credentials, and via which the host computing device now has the network connectivity; and
   responsively connecting the electronic device to the second wireless network using the network credentials communicated from the host computing device, the electronic device then having the network connectivity via the second wireless network.

2. The method of claim 1, further comprising:
   determining a plurality of wireless networks that are accessible by the electronic device;
   communicating over the wireless sideband communication channel, from the electronic device to the host computing device, the wireless networks that are accessible by the electronic device; and
   selecting the second wireless network as one of the communicated wireless networks for which the host computing device has network credentials.

3. The method of claim 1, further comprising:
   determining a plurality of wireless networks for which the host computing device has network credentials;
   communicating over the wireless sideband communication channel, from the host computing device to the electronic device, the wireless networks for which the host computing device has the network credentials; and
   selecting the second wireless network as one of the communicated wireless networks that are accessible by the electronic computing device.

4. A non-transitory computer-readable data storage medium storing program code executable by a host computing device to perform processing comprising:
   subsequent to an electronic device and the host computing device no longer being connected to a first wireless network via which the electronic device and the host computing device had network connectivity,
   transmitting to the electronic device over a wireless sideband communication channel network credentials for a second wireless network different than the first wireless network and the wireless sideband communication channel, for which the host computing device has the network credentials, via which the host computing device now has the network connectivity, and that is accessible by the electronic device,
   wherein the electronic device responsively connects to the second wireless network using the network credentials transmitted by the host computing device, the electronic device then having the network connectivity via the second wireless network.

5. The non-transitory computer-readable data storage medium of claim 4, wherein the processing further comprises:
   receiving a notification that the electronic device is no longer connected to the first wireless network.

6. The non-transitory computer-readable data storage medium of claim 4, wherein the processing further comprises:
   receiving from the electronic device over the wireless sideband communication channel a plurality of wireless networks that are accessible by the electronic device;
   determining which of the wireless networks received from the electronic device for which the host computing device has network credentials; and
   selecting the second wireless network as one of the determined wireless networks for which the host computing device has the network credentials.

7. The non-transitory computer-readable data storage medium of claim 4, wherein the processing further comprises:
   determining a plurality of wireless networks for which the host computing device has network credentials;
   transmitting to the electronic device over the wireless sideband communication channel the wireless networks for which the host computing device has the network credentials;
   receiving from the electronic device over the wireless sideband communication channel which of the wireless networks are accessible by the electronic device; and
   selecting the second wireless network as one of the received wireless networks that are accessible by the electronic computing device.

8. The non-transitory computer-readable data storage medium of claim 4, wherein the processing further comprises:
   transmitting to the electronic device network credentials for the first wireless network,
   wherein the electronic device responsively connects to the first wireless network using the network credentials transmitted by the host computing device, the electronic device then having the network connectivity via the first wireless network before no longer being connected to the first wireless network and losing the network connectivity via the first wireless network.

9. The non-transitory computer-readable data storage medium of claim 4, wherein the electronic device is a computer or a smartphone.

10. An electronic device comprising:
   a wireless network adapter to connect to a first wireless network and a second wireless network;
   a wireless sideband communication channel transceiver to communicate with a host computing device over a wireless sideband communication channel;
   a processor; and
   a memory storing program code executable by the processor to:
      detect that the wireless network adapter is no longer connected to the first wireless network via which the electronic device had network connectivity;
      subsequently receive, from the host computing device that also is no longer connected to the first wireless network via which the host computing device also had the network connectivity, over the wireless sideband communication channel network credentials for the second wireless network that is different than the first wireless network and the wireless sideband communication channel, for which the host computing device has the network credentials, via which the host computing device now has the network connectivity, and that is accessible by the electronic device; and
      responsively cause the wireless network adapter to connect to the second wireless network using the network credentials received from the host computing device, the electronic device then having the network connectivity via the second wireless network.

11. The electronic device of claim 10, wherein the program code is executable by the processor to further:
   responsive to detecting that the wireless network is no longer connected to the first wireless network, transmit a notification that the electronic device is no longer connected to the first wireless network.

12. The electronic device of claim 10, wherein the program code is executable by the processor to further:
   determine a plurality of wireless networks that are accessible by the wireless network adapter; and
   transmit to the host computing device over the wireless sideband communication channel the wireless networks that are accessible by the wireless network adapter,
   wherein the second wireless network is selected by the host computing device as one of the transmitted wireless networks for which the host computing device has network credentials.

13. The electronic device of claim 10, wherein the program code is executable by the processor to further:
   receive from the host computing device over the wireless sideband communication channel a plurality of wireless networks for which the host computing device has network credentials;
   determine which of the received wireless networks are accessible by the wireless network adapter; and
   transmit to the host computing device over the wireless sideband communication channel the determined wireless networks that are accessible by the wireless network adapter,
   wherein the second wireless network is selected by the host computing device as one of the determined and transmitted wireless networks that are accessible by the electronic device.

14. The electronic device of claim 10, wherein the program code is executable by the processor to further:
   receive from the host computing device network credentials for the first wireless network; and
   responsively cause the wireless network adapter to connect to the first wireless network using the network credentials received from the host computing device, the electronic device then having the network connectivity via the first wireless network before the wireless network adapter no longer being connected to the first wireless network and the electronic device losing the network connectivity via the first wireless network.

15. The electronic device of claim 10, wherein the electronic device is a printing device and further comprises print hardware.

* * * * *